US008101256B1

(12) United States Patent
Cowan

(10) Patent No.: US 8,101,256 B1
(45) Date of Patent: Jan. 24, 2012

(54) LABEL STRUCTURE INCLUDING A TWO PLY RECLOSABLE FLAP

(76) Inventor: Randy G. Cowan, Sioux Falls, SD (US)

( * ) Notice: Subject to any disclaimer, the term of this patent is extended or adjusted under 35 U.S.C. 154(b) by 975 days.

(21) Appl. No.: 12/070,766

(22) Filed: Feb. 21, 2008

(51) Int. Cl.

| | |
|---|---|
| ***B32B 9/00*** | (2006.01) |
| ***B32B 33/00*** | (2006.01) |
| ***G09F 3/10*** | (2006.01) |
| ***G09F 23/00*** | (2006.01) |
| ***B44C 1/165*** | (2006.01) |

(52) U.S. Cl. ..................... 428/40.1; 428/41.8; 428/41.7; 428/42.2; 40/299.01; 40/637; 40/638

(58) Field of Classification Search ................. 428/40.1, 428/40.5, 41.7, 41.8, 42.2, 42.3; 283/81; 40/299.01, 306, 310, 312, 637, 638
See application file for complete search history.

(56) References Cited

U.S. PATENT DOCUMENTS 3,971,866 A 7/1976 Johnson
4,609,589 A 9/1986 Hosoda et al.
4,621,837 A 11/1986 Mack
4,930,812 A 6/1990 Howard
4,991,878 A 2/1991 Cowan et al.
5,021,273 A 6/1991 Kobayashi
5,074,595 A 12/1991 Hill et al.
D327,709 S 7/1992 Hagen
5,154,956 A 10/1992 Fradrich
5,200,243 A 4/1993 Van Veen
5,234,735 A 8/1993 Baker et al.
5,263,743 A 11/1993 Jones
5,284,363 A * 2/1994 Gartner et al. .................. 283/81
5,290,616 A 3/1994 Cowan et al.
5,324,559 A 6/1994 Brombacher
5,399,403 A 3/1995 Instance
5,403,636 A 4/1995 Crum
5,439,721 A 8/1995 Pedroli et al.
5,507,901 A 4/1996 Limina et al.
5,587,222 A 12/1996 Hoffmann
5,588,239 A 12/1996 Anderson
5,674,334 A 10/1997 Instance
5,736,212 A 4/1998 Fischer
5,738,382 A 4/1998 Grosskopf et al.

(Continued)

FOREIGN PATENT DOCUMENTS

EP 0506202 9/1992

(Continued)

*Primary Examiner* — Patricia Nordmeyer
(74) *Attorney, Agent, or Firm* — Jeffrey A. Proehl; Woods, Fuller, Shultz & Smith, PC

(57) ABSTRACT

A label structure is disclosed for product packaging that includes a base panel having a front face and a rear face with an adhesive on the rear face. A first panel overlies a portion of the front face of the base panel, and has an inner page surface with an adhesive thereon. A laminating layer has a front face and a rear face with an adhesive on the rear face. The front face is adhered to the adhesive on the inner page surface of the first panel. A release layer is applied to a first region of the base panel that is overlaid by the first panel, with a second region of the base panel overlaid by the first panel being free of the release layer so that the portion of the laminating layer overlying the first region is releasable from adhesion to the base panel while a portion of the laminating layer overlying the second region is substantially permanently adhered to the base panel.

17 Claims, 5 Drawing Sheets

U.S. PATENT DOCUMENTS

| | | | |
|---|---|---|---|
| 5,804,271 | A | 9/1998 | Barry |
| 5,863,628 | A | 1/1999 | Barry |
| 5,866,219 | A | 2/1999 | McClure et al. |
| 5,951,054 | A | 9/1999 | Hagen et al. |
| 5,972,455 | A | 10/1999 | Barry |
| 6,027,598 | A | 2/2000 | Anderson |
| 6,027,780 | A | 2/2000 | Treleaven et al. |
| 6,057,019 | A | 5/2000 | Barry |
| 6,120,637 | A | 9/2000 | Barry |
| 6,210,767 | B1 | 4/2001 | Knauf |
| 6,213,520 | B1 | 4/2001 | Treleaven et al. |
| 6,254,137 | B1 | 7/2001 | Baum et al. |
| 6,306,476 | B1 | 10/2001 | Barry |
| 6,329,034 | B1 | 12/2001 | Pendry et al. |
| 6,398,263 | B2 | 6/2002 | Treleaven et al. |
| 6,413,345 | B1 | 7/2002 | Treleaven |
| 6,432,500 | B1 | 8/2002 | Jones et al. |
| 6,439,614 | B1 | 8/2002 | Cowan |
| 6,447,862 | B1 | 9/2002 | Rankin et al. |
| 6,531,023 | B1 | 3/2003 | Barry |
| 6,541,090 | B2 | 4/2003 | Grosskopf et al. |
| 6,645,592 | B1 | 11/2003 | Cowan |
| 7,077,435 | B1 | 7/2006 | Cowan |
| 7,179,514 | B2 | 2/2007 | Olsen et al. |
| 2001/0004152 | A1 | 6/2001 | Treleaven et al. |
| 2001/0011821 | A1 | 8/2001 | Lind |

FOREIGN PATENT DOCUMENTS

| | | |
|---|---|---|
| EP | 0833295 | 9/1997 |
| GB | 2220886 | 1/1990 |
| WO | WO 92/04704 | 3/1992 |
| WO | WO 98/07131 | 2/1998 |

* cited by examiner

LABEL STRUCTURE INCLUDING A TWO PLY RECLOSABLE FLAP

BACKGROUND OF THE INVENTION

1. Field of the Invention

The present invention relates to label structures and more particularly pertains to a new label structure including a two ply reclosable flap that is simpler and more economical to produce.

2. Description of the Prior Art

Labels for product packaging are produced in many different configurations, and are produced in many ways using many different materials and methods. Not surprisingly, there is a continual desire to simplify the processes for assembling the various types of label structures to produce the labels faster and more economically.

One label assembly operation that can make the whole label assembly process more complex and difficult to successfully achieve is the application of adhesive to one or more component parts of the label. In addition to the additional station and apparatus in the production line that is typically required to apply the adhesive to the web of stock material, and the inherent difficulties in maintaining such a station and the space in the label structure production line taken up by such a station, there are also concerns about maintaining a uniform thickness of the adhesive being applied to the web of stock material so that the finished labels have a consistent thickness. Inconsistent thickness in the finished labels can cause a number of problems, but one of the more significant problems is the effect on the machinery that is employed to apply the finished label to the product packaging, which typically occurs at a location that is remote from the label production line that produces the labels. Consistency in the thickness of the labels produced is therefore a significant goal, and the need to apply adhesive to label stock material during the label assembly process can be a significant impediment to achieving that goal.

Therefore, there is a general need for a label whose structure avoids the need to apply adhesive to label material during the assembly process, and in so doing provides a label structure that is simpler and more economical to produce than label structures that require the application of adhesive during the assembly process.

SUMMARY OF THE INVENTION

In view of the foregoing disadvantages inherent in the known types of label structures now present in the prior art, the present invention provides a new label structure including a two ply reclosable flap wherein the same can be more simply and more economically produced than label structures that require the application of adhesive during the assembly process.

To attain this, the present invention generally comprises a label structure that has a back for orienting rearwardly toward a product packaging, and a front for orienting forwardly away from the product packaging. The label structure includes a base panel for affixing to a surface of the product packaging, and the base panel has a front face and a rear face with an adhesive on the rear face. The label structure further includes a first panel that overlies a portion of the front face of the base panel, and has an inner page surface facing rearwardly and an outer page surface facing forwardly. An adhesive is located on the inner page surface of the first panel. The label structure also includes a laminating layer having a front face and a rear face, with the front face being adhered to at least a portion of the inner page surface of the first panel by the adhesive on the inner page surface. An adhesive is located on the rear face of the laminating layer. A release layer is applied to a first region of the base panel that is overlaid by the first panel, with a second region of the base panel that is overlaid by the first panel being free of the release layer. The release layer permits the adhesive on a portion of the laminating layer overlying the first region to be releasable from adhesion to the base panel while a portion of the laminating layer overlying the second region is substantially permanently adhered to the base panel.

In another aspect of the invention, a method of assembling a label structure is contemplated that includes providing a base panel that has a front face and a rear face with an adhesive on the rear face. A release layer is applied to the front face of the base panel such that a first region of the front face has the release layer and a second region of the front face is free of the release layer. A laminating layer, having a front face and a rear face with an adhesive on the rear face, is positioned a portion of the front face of the base panel that includes at least a portion of the first region and at least a portion of the second region such that the laminating layer adheres to the respective portions of the first and second regions. A first panel, having an inner page surface and an outer page surface with an adhesive on the inner page surface, is positioned on the laminating layer such that the first panel adheres to the front face of the laminating layer. The release layer permits the adhesive on a portion of the laminating layer overlying the first region to be releasable from adhesion to the base panel while a portion of the laminating layer overlying the second region is substantially permanently adhered to the base panel.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

One significant aspect of the present invention is the provision of a label structure having a reclosable flap that may be assembled in an assembly line using components that have adhesive pre-applied to them, to avoid having to apply adhesives to the component parts of the label structure as a part of the assembly line.

Further advantageous aspects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects of the invention will become apparent when consideration is given to the following detailed description thereof. Such description makes reference to the annexed drawings wherein.

DESCRIPTION OF PREFERRED EMBODIMENTS

Figure 1:
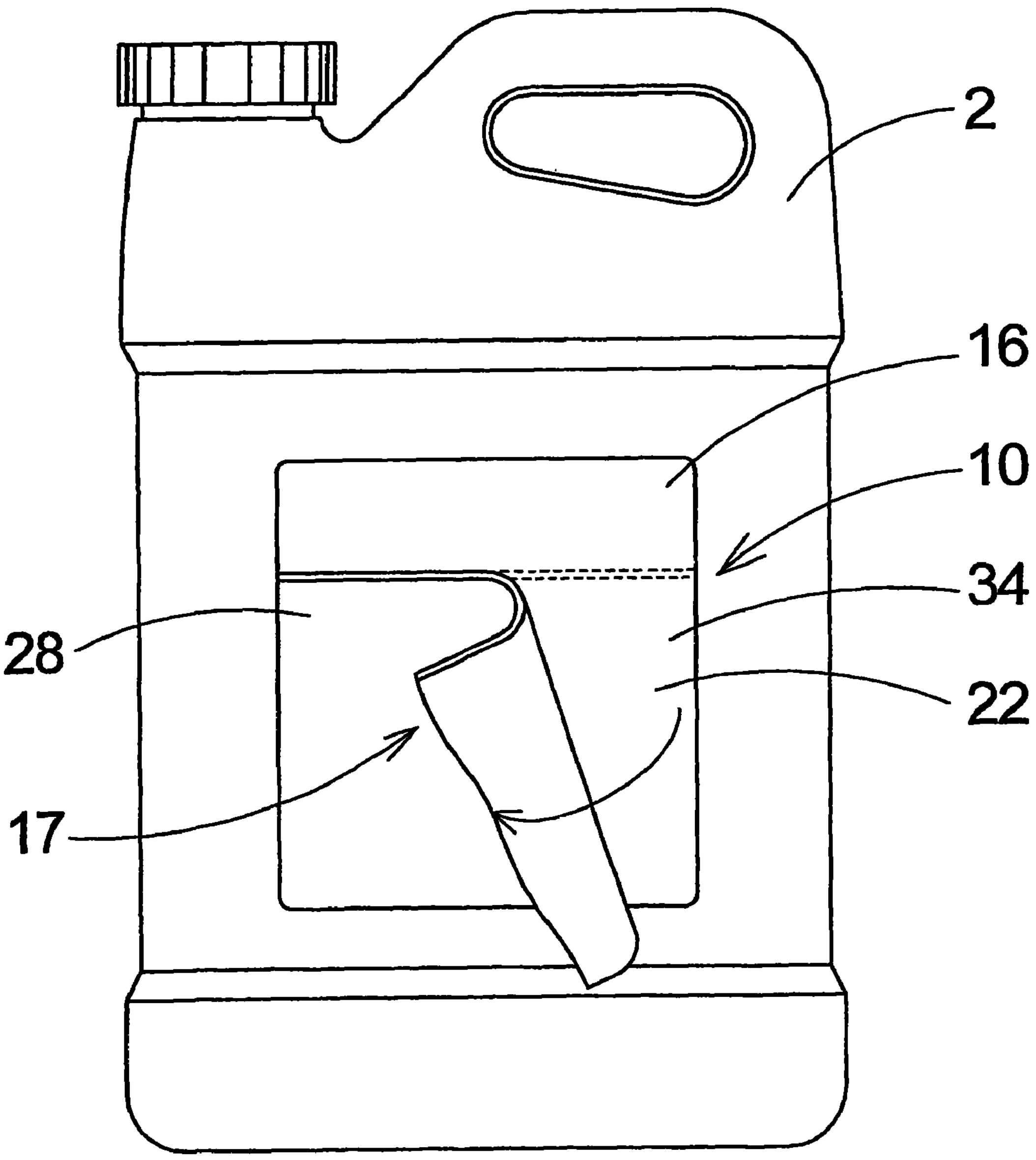
FIG. 1 is a schematic front view of a product package, in the form of a container, with the new label structure including a two ply reclosable flap according to the present invention applied thereto.
Figure 2:
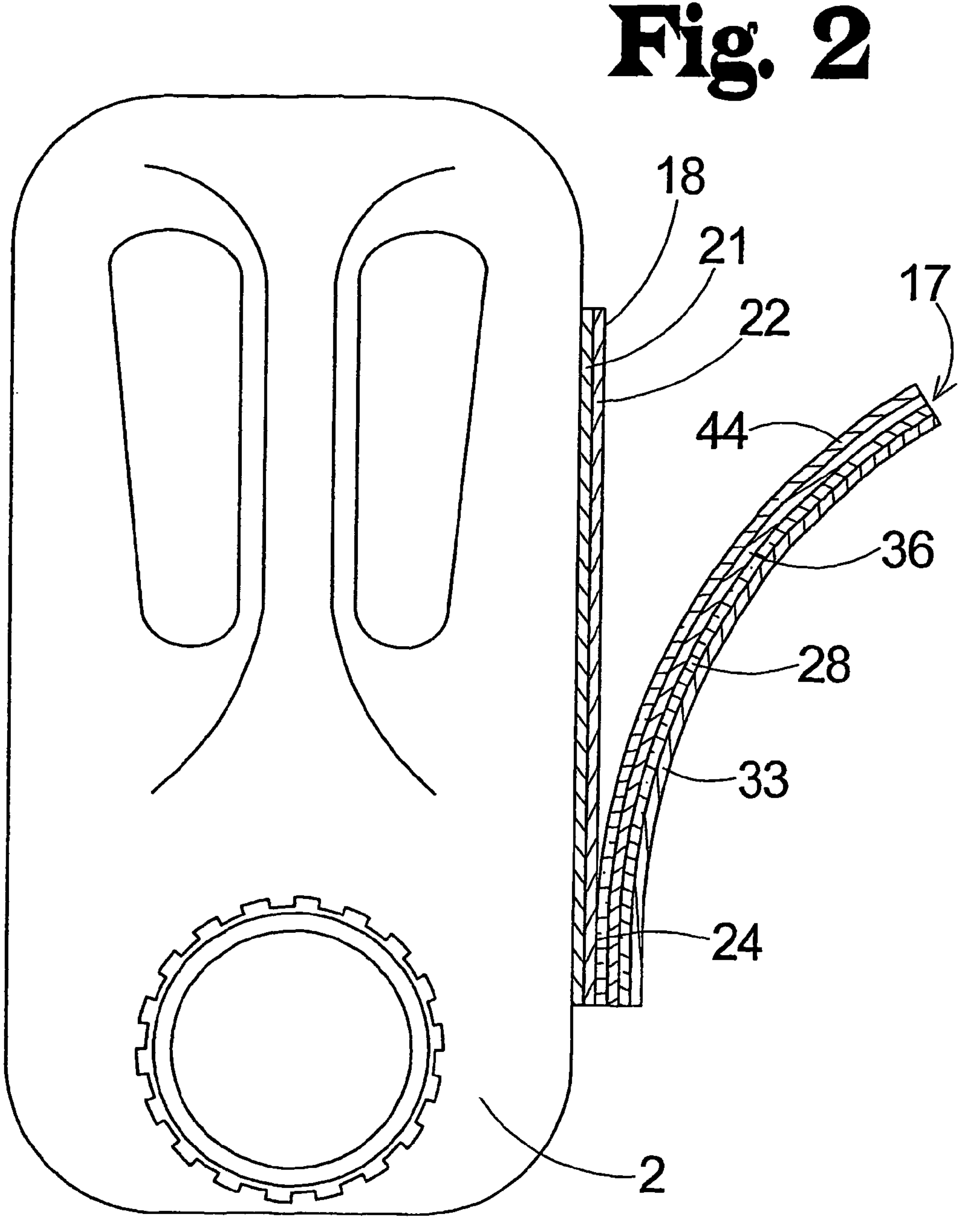
FIG. 2 is a schematic top view of the container with the inline label structure of the present invention shown with the first panel pivoted into an open condition with respect to the base label.
Figure 3:
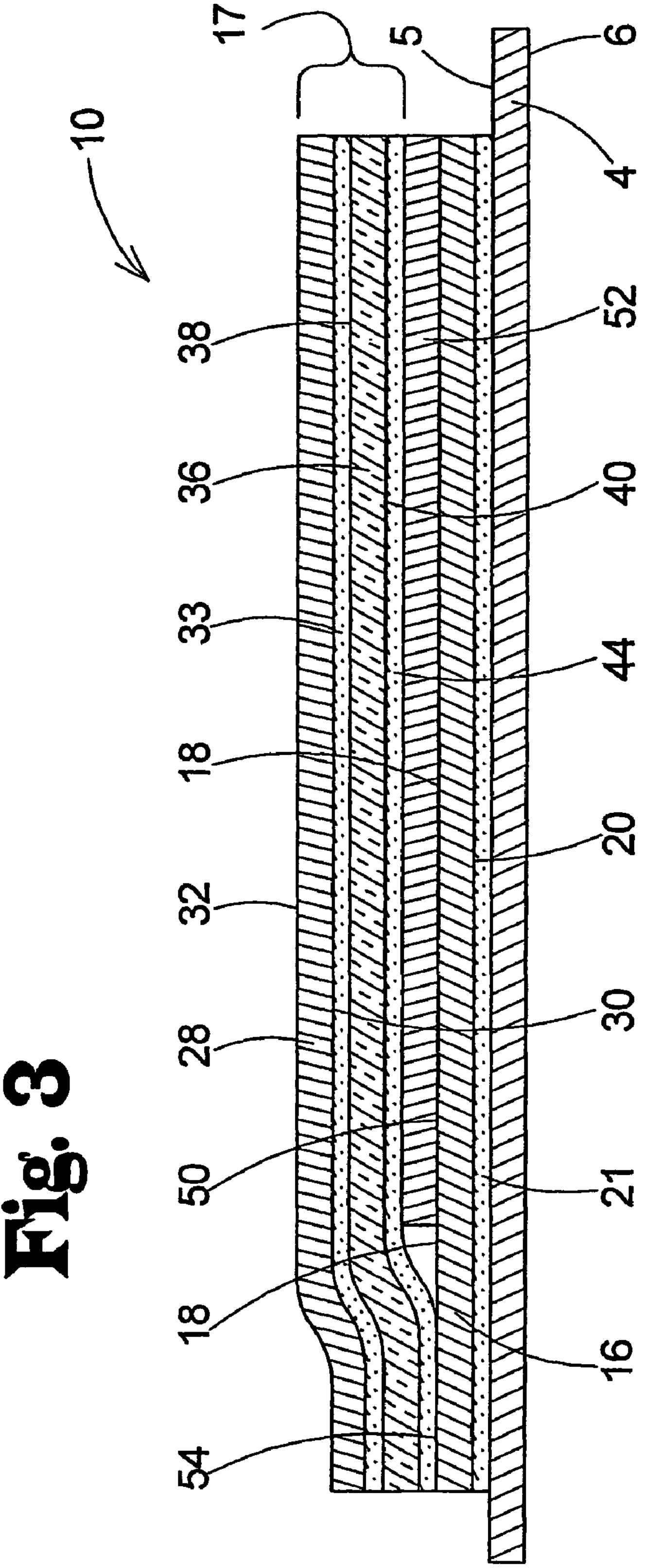
FIG. 3 is a schematic sectional view of the label structure of the present invention shown in a closed condition.
Figure 4:
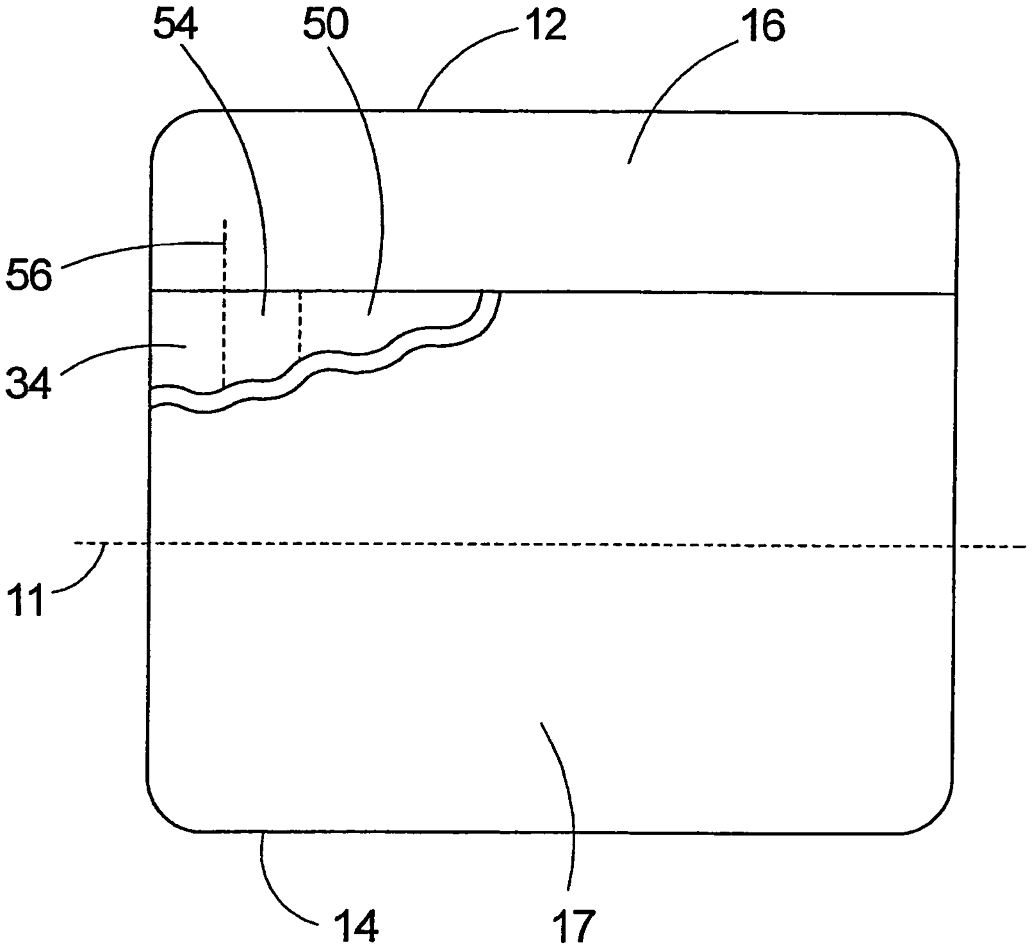
FIG. 4 is a schematic front view of the label structure of the present invention shown with a portion of the first panel broken away to reveal the first and second regions of the front face of the base panel.
Figure 5:
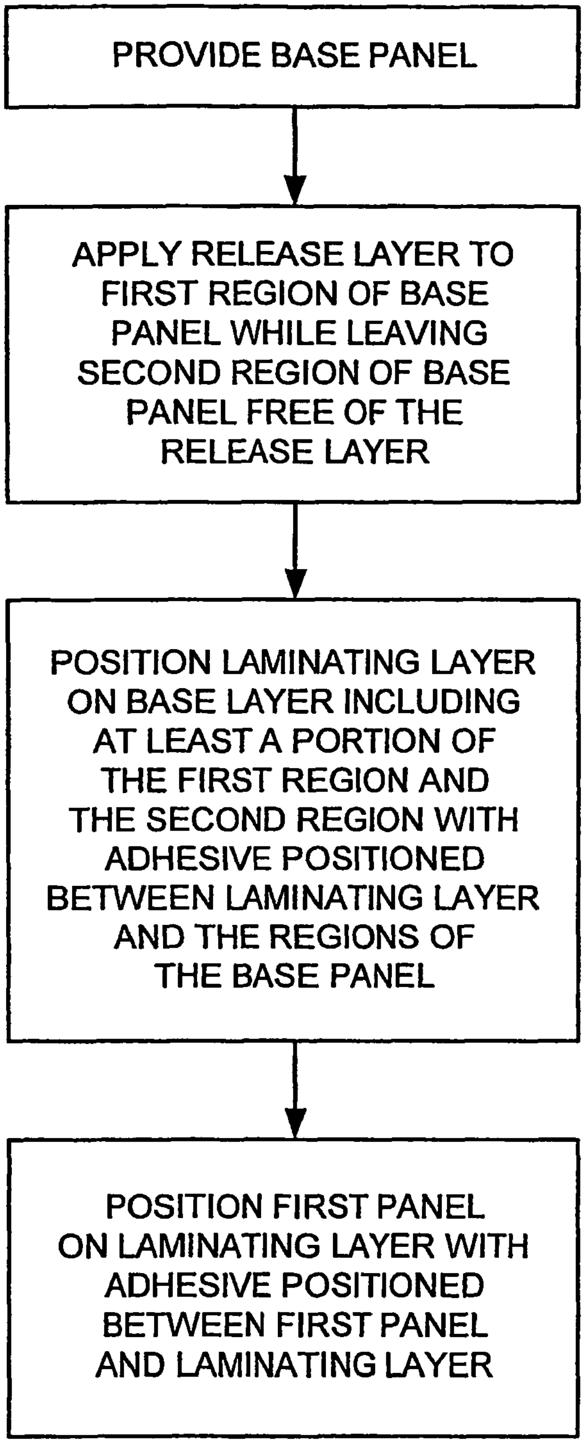
FIG. 5 is a schematic flowchart of one process for assembling the label structure of the present invention.

With reference now to the drawings, and in particular to FIGS. 1 through 5 thereof, a new label structure including a two ply reclosable flap embodying the principles and concepts of the present invention and generally designated by the reference numeral 10 will be described.

For ease and clarity of description, a number of relative orientation conventions will be used in describing the label structure 10 of the invention and associated elements. The label structure 10 has a front and a back (or rear), with the back of the label structure being oriented relatively toward a product, a product package, or a liner carrying the label structure 10, while the front of the label structure 10 is oriented relatively away from the product, product packaging, or liner. An element or aspect of the invention that is described as being forward relative to another element or aspect is thus located, to a greater degree, in the forward direction. Similarly, an element or aspect of the invention that is described as being backward or rearward relative to another element or aspect is thus located, to a greater degree, in the backward or rearward direction. Additionally, the portion of a label referred to as a panel has a single thickness of material, and each panel has opposite faces or surfaces that comprise pages. Permanently adhered, or substantially permanently adhered, is used in the sense that attempts to remove or separate the adhered parts is highly likely to result in the destruction of one or both of the adhered parts, such as through tearing or separation of otherwise integral layers of the part, and the parts cannot be adhered together using the adhesive present. Peelably adhered or separably adhered is used in the sense that, while the parts so adhered tend to be held together when brought into contact with each other, the parts may be easily separated from each other with finger pulling force applied to one or both of the parts, and may be re-adhered together simply by bringing the parts back into contact with each other, with or without pressing the parts together.

The invention contemplates the mounting of the label structure 10 on a product package 2, such as a container or bottle, although it will be realized that the label structure of the invention may be employed on a variety of different types of packaging, including bags, boxes, cartons, and the like. Prior to application to a package, the label structure 10 may be removably mounted or carried on a carrier liner 4. The liner 4 is provided for carrying at least one label structure 10 after the label structure has been formed and prior to application of the label structure to a surface, such as on a package 2. The liner 4 may comprise an elongate web of material that may be coiled about a spool with a plurality of the label structures applied thereon. The elongate liner 4 may have a longitudinal extent or axis that extends along a longitudinal extent of the liner. The liner 4 has front 5 and back (or rear) 6 faces. The front face 5 of the liner preferably comprises a release surface that permits peeling of the label structure from the front face. Illustratively, a silicone composition may be applied to the front face 5 to form the release surface, and the liner 4 may comprise a paper material, although other materials may also be suitable for forming the liner 4.

The label structure 10 may have a first axis 11 that extends substantially parallel to the longitudinal extent of the liner 4, and so the first axis extends generally in the direction of movement of the liner, and the web of materials forming the label structure, when the label structure is being formed. When applied to the package 2, the first axis is preferably positioned in a substantially horizontal orientation. The label structure 10 may have a first side edge 12 and a second side edge 14, and each of the side edges 12, 14 may extend substantially parallel to the first axis. In one preferred application of the label structure 10 to a product package 2, the first side edge 12 is located at a relatively higher vertical level than the second side edge 14, a relationship which is illustratively shown in FIG. 1.

In general, the label structure 10 includes a base panel 16 and a flap 17 that is adhered to the base panel 16 but is able to be partially peeled or pivoted away from the base panel 16 to permit viewing of markings that are located on the backside of the flap 17 or the portion of the base panel 16 below the flap 17.

In greater detail, the base panel 16 of the label structure 10 is, in use, affixed or adhered to a surface of the product package 2, and is adhered to the liner 4 prior to affixation to the package 2. The base panel 16 has a front face 18 and a back face 20. An adhesive 21 may be applied on the back face 20 to permit the back face 20 to be removably adhered to the front face 5 of the liner 4. The adhesive 21 may comprise, for example, a pressure sensitive adhesive, although it will be appreciated that other adhesive materials may be employed. Illustratively, the base panel 16 comprises a plastic stock that has a pre-applied acrylic emulsion adhesive and is supplied with a kraft paper liner, such as is available, for example, under the tradename WG9512 WHITE GOLD High Gloss from Morgan Adhesives Company of Stow, Ohio. However, it should be understood that the base panel 16 could comprise other forms of stock, and thus is not necessarily limited to the illustrative form of stock or the illustrative product source.

The front face 18 of the base panel 16 may have various information or indicia marked thereon for conveying information. The front face 18 may include, for example, a polymer coating to facilitate printing or otherwise marking the information on the surface of the base panel 16.

The flap 17 of the label structure 10 of the invention may include a first panel 28 that overlies at least a portion of the front face 18 of the base panel 16. The first panel 28 has an inner page surface 30 and an outer page surface 32, with the inner page surface 30 facing generally backwardly or rearwardly, and toward the base panel 16. The outer page surface 32 faces generally forwardly, and away from the base panel 16. An adhesive 33 is positioned adjacent to the inner page surface 30 of the first panel 28. In one highly preferred embodiment of the invention, the adhesive 33 is pre-applied to the material of the first panel 28 on the surface that forms the inner page surface of the first panel 28, although it is possible that the adhesive may be applied at the time of forming the finished label structure (although this is a more complex and thus less desirable process). Illustratively, the first panel 28 is formed of a plastic film with the adhesive pre-applied, although paper or other fibrous material may be employed. One exemplary material for the first panel 28 is available under the tradename ALLURE from Morgan Adhesives Company of Stow, Ohio, although those skilled in the art will recognize that there are numerous products that may be employed for forming the first panel 28. Again, it should be understood that the first panel 28 could comprise other forms of stock, and thus is not necessarily limited to the illustrative form of stock or the illustrative product source.

Each of the page surfaces 30, 32 of the first panel 28 may have textual or graphical information marked thereon. The textual or graphical information may be printed or otherwise marked on the inner page surface 30 of the first panel 28 over the adhesive 33 that is present on the inner page surface 30.

In some preferred embodiments of the invention, the flap 17 extends over a fractional portion 34 of the area of the front face 18 of the base panel 16, and not over the entire area of the front face, although in other embodiments the flap 17 may be substantially coextensive with the base panel 16 so that substantially the entire front face 18 of the base panel 16 is covered by the first panel 28 when the first panel is in a closed condition.

The label structure 10 may also include a laminating layer 36 that is positioned between the first panel 28 and the base panel 16, and thus overlies at least a portion of the base panel 16. The laminating layer 36 may function to protect the printing or markings on the adhesive 33 on the inner page surface 30 of the first panel from substances that might otherwise cause the printing to run or to smear, or even to transfer to other surfaces, such as on the base panel. Further, the laminating layer 36 may serve to give the flap 17 a greater thickness which lends a heavier body to the flap and resistance to tearing. In the most preferred embodiments of the invention, the laminating layer 36 is substantially coextensive with the first panel 28, although it may be possible for the laminating layer 36 to be somewhat larger or smaller than the first panel 28. The laminating layer 36 has a front face 38 and a rear face 40, and the front face 38 may be adhered to the outer page surface 32 of the first panel 28 by the adhesive 33 that is located on the outer page surface 32, and preferably the laminating layer 36 is substantially permanently adhered or united with the first panel 28 by the adhesive 33. Preferably, the laminating layer 36 is substantially transparent to permit markings on the first panel (or the adhesive 33) to be viewable, but the laminating layer could possibly be translucent in nature.

An adhesive 44 is located on the rear face 40 of the laminating layer 36, and preferably covers substantially the entire rear face 40 of the laminating layer 36, although a smaller portion of the rear face 40 may be covered. Preferably, the adhesive 44 is pre-applied to the rear face 40 of the laminating layer 36 such that adhesive does not need to be applied at the time of forming the label structure 10, to thereby simplify the assembling of the label structure 10, although it is possible that the adhesive 44 could be applied at the time that the label structure 10 is being formed which would be less desirable. One illustrative material for use as the laminating layer 36 is a clear polypropylene overlaminate film material that available under the tradename "410" from ACPO Ltd. of Port Clinton, Ohio, which is provided with a pre-applied clear emulsion acrylic adhesive. Those skilled in the art will recognize that other materials may also be suitably employed as the laminating layer of the invention, and thus could comprise other forms of stock from other product sources.

Significantly, the portion of the front face 18 of the base panel 16 over which the first panel 16 and the laminating layer 36 may be divided into at least a first region 50, which has a release layer 52 applied thereto, and a second region 54, which is essentially free of the release layer 52. In some embodiments, the release layer 52 applied to the base panel 16 does not extend beyond the first region 50 or beyond the perimeter of the laminating layer 36 that overlies the base panel 16, although the release layer 52 may extend over a greater portion of the base panel 16 than the laminating layer 36 actually overlies.

Preferably, the release layer 52 is applied to the front face 18 of the base panel 16 during the process of assembling the components of the label structure 10 into the finished label structure so that the first and second regions can be readily changed or adjusted, and may be applied in a manner similar to a printing process. Illustratively, the release layer 52 may comprise a material sold under the tradename UV FLEXO TRANSPARENT BLUE, which is available from SICPA North America of Oakville, Ontario Canada, although other suitable materials from other sources that produce a relatively low adhesion surface may be employed.

As a result of the presence of the release layer 52 on the first region 50 of the base panel 16, the adhesive 44 creates a peelable bond between the laminating layer 36 and the base panel 16 in the first region 50 so that the flap 17 (including the laminating layer 36 and the first panel 28) may be peeled away from, and re-adhered to, the base panel 16 over the first region 50. In one embodiment of the invention, the bond between the laminating layer 36 and the base panel 16 in the first region 50 might be compared to a somewhat sticky adhesion or a static cling-like attraction that is relatively easily overcome by finger pulling of the parts apart by the user's fingers. In contrast, the bond between the laminating layer 36 and the base panel 16 in the second region 54, where there is no release layer 52 present on the front face 18, is a substantially permanent adhesion that may require the application of a significant degree of force to separate the laminating layer 36 of the flap 17 from the base panel 16, and upon separation, one or both of these elements may be torn or destroyed.

As the first region 50 has the release layer 52 applied thereon and the second region 54 is substantially free of the release material, a hinge or structure functioning as a hinge is effectively formed to permit a relative large portion of the flap 17 (which may generally correspond in size and dimensions to the first region 50 of the base panel 16) to pivot with respect to the base panel 16. The adhesive 44 on the laminating layer 36 also tends to hold the flap 17 in a closed position against the base panel 16, while permitting the flap 17 to be peeled and pivoted away from the base panel 16 with finger pulling force to expose the first region 50 of the base panel 16.

In the illustrative embodiment of the invention, the second region 54 is positioned on the base panel 16 in a location that extends along one of the sections of the perimeter edge 56 of the laminating layer 36, and is also elongate with a longitudinal axis 56, such that the adhesion between the laminating layer 36 and the base panel creates a hinge-like structure about which the first panel 28 and the laminating layer 36 may move in an essentially pivot-like movement when the first panel and laminating layer are peeled away from the base panel 16. Thus, the portion of the laminating layer 36 and the first panel 28 that overlie the first region 50 are peelable away from the base panel 16, and upon reaching the second region 54, the laminating layer 36 and the first panel 28 can not be further peeled away from the base panel 16, and the first panel and the laminating layer tend to pivot like the page of a book.

Illustratively, the longitudinal axis 56 of the second region 54 may extend in a direction that is oriented substantially perpendicular to a longitudinal extent of the liner 4, and also with respect to the first 7 and second 8 side edges of the label structure 10. The second region 54 may be relatively narrow with respect to the first region 50, which is typically much broader in the direction oriented perpendicular to the side edges 7, 8. The area of the second region 54 is preferably significantly smaller than the area of the first region 50, and is in most cases the area of the second region 54 is less than approximately 30 percent of the area of the first region 50, although areas of less than approximately 20 percent, or even less than approximately 10 percent of the area of the first region 50 are possible.

Optionally, additional panels forming additional flaps may be employed in front of the first panel with a release layer applied to the outer page surfaces of the respective panels to produce the first and second regions on each of the intervening panels.

The components of the label structure 10 of the invention are thus relatively simply and easily assembled into the label structure, and can be accomplished without the application of adhesives to the various webs or panels during the assembly process. The stacking, or piggy-backing, of the material forming first panel 28 and the adhesive layer 33 on the material forming the laminating layer 36 and adhesive 44 permits a relatively simple inline assembly process without have to employ multiple lines in which subsidiary label structures are assembled or adhesive applied.

The invention also contemplates a method (see FIG. 5) of assembling the label structure 10, which includes providing the base panel 16 with a front face 18 and a rear face 20, with an adhesive 21 on the rear face 20. A release layer 52 is applied to the front face 18 of the base panel 16 such that a first region 50 of the front face 18 has the release layer 52 and a second region 54 of the front face 18 is free of the release layer 52. The laminating layer 36, which has a front face 38 and a rear face 40 with an adhesive 44 on the rear face 40, is positioned on a portion of the front face 18 of the base panel 16 that includes at least a portion of the first region 50 and at least a portion of the second region 54 such that the laminating layer 36 adheres to the respective portions of the first 50 and second 54 regions. The first panel 28, which has an inner page surface 30 and an outer page surface 32 with an adhesive 33 on the inner page surface 30, is positioned on the laminating layer 36 such that the first panel 28 adheres to the front face 38 of the laminating layer 36. When assembled according to this method, the release layer 52 permits the adhesive 44 on a portion of the laminating layer 36 that overlies the first region 50 to be releasable from adhesion to the base panel 16 while a portion of the laminating layer 36 that overlies the second region 54 is substantially permanently adhered to the base panel 16.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A label structure having a back for orienting rearwardly toward a product packaging and a front for orienting forwardly away from the product packaging, the label structure comprising:

a base panel for affixing to a surface of the product packaging, the base panel having a front face and a rear face with an adhesive on the rear face;

a first panel overlying a portion of the front face of the base panel, the first panel having an inner page surface facing rearwardly and an outer page surface facing forwardly, an adhesive being located on the inner page surface of the first panel;

a laminating layer having a front face and a rear face, the front face being adhered to at least a portion of the inner page surface of the first panel by the adhesive on the inner page surface, an adhesive being located on the rear face of the laminating layer; and a release layer applied to a first region of the base panel that is overlaid by the first panel with a second region of the base panel overlaid by the first panel being free of the release layer, the release layer permitting the adhesive on a portion of the laminating layer overlying the first region to be releasable from adhesion to the base panel while a portion of the laminating layer overlying the second region is substantially permanently adhered to the base panel.

2. The label structure of claim 1 wherein the second region is elongate with a longitudinal axis.

3. The label structure of claim 2 wherein the base panel has at least one side edge, and wherein the longitudinal axis of the second region extends in a direction oriented substantially perpendicular to the side edge.

4. The label structure of claim 1 wherein the area of the second region of the base panel is less than approximately 30 percent of the area of the first region of the base panel.

5. The label structure of claim 1 wherein the release layer is printed onto the base panel.

6. The label structure of claim 1 wherein the laminating layer is substantially coextensive with the first panel.

7. The label structure of claim 1 wherein the first panel is substantially coextensive with the base panel.

8. The label structure of claim 1 wherein the first panel extends over a fractional portion of the front face of the base panel.

9. The label structure of claim 1 wherein the laminating layer is substantially permanently adhered to the inner page face of the first panel.

10. The label structure of claim 1 wherein the laminating layer is substantially transparent.

11. The label structure of claim 1 additionally comprising a liner positioned adjacent to the rear face of the base panel, the liner being adhered to the base panel by the adhesive to the rear face of the base panel.

12. The label structure of claim 1 wherein the first panel and laminating layer are configured such that the first panel and laminating layer are peelably separable as a unit from the release layer applied to the first region of the base panel.

13. The label structure of claim 1 wherein the first panel is formed from a web of material.

14. A method of assembling a label structure, comprising:

providing a base panel having a front face and a rear face with an adhesive on the rear face;

applying a release layer to the front face of the base panel such that a first region of the front face has the release layer and a second region of the front face is free of the release layer;

positioning a laminating layer, having a front face and a rear face with an adhesive on the rear face, on a portion of the front face of the base panel that includes at least a portion of the first region and at least a portion of the second region such that the laminating layer adheres to the respective portions of the first and second regions; and positioning a first panel, having an inner page surface and an outer page surface with an adhesive on the inner page surface, on the laminating layer such that the first panel adheres to the front face of the laminating layer;

wherein the release layer permits the adhesive on a portion of the laminating layer overlying the first region to be releasable from adhesion to the base panel while a portion of the laminating layer overlying the second region is substantially permanently adhered to the base panel.

15. A label structure having a back for orienting rearwardly toward a product packaging and a front for orienting forwardly away from the product packaging, the label structure comprising:

a base panel for affixing to a surface of the product packaging, the base panel being formed from a web of material having a front face and a rear face with an adhesive on the rear face;

a first panel overlying a portion of the front face of the base panel, the first panel being formed from a web of material having an inner page surface facing rearwardly and an outer page surface facing forwardly, a pre-applied adhesive being located on the inner page surface of the first panel;

a substantially transparent laminating layer formed from a web of material having a front face and a rear face, the front face being adhered to at least a portion of the inner page surface of the first panel by the adhesive on the inner page surface, a pre-applied adhesive being located on the rear face of the laminating layer; and a release layer printed on a first region of the base panel during assembly of the label structure, the first region being overlaid by the first panel, a second region of the base panel overlaid by the first panel having no release layer printed thereon, the release layer permitting the adhesive on a portion of the laminating layer overlying the first region to be releasable from adhesion to the base panel while a portion of the laminating layer overlying the second region is substantially permanently adhered to the base panel;

wherein the first panel and laminating layer are configured such that the first panel and laminating layer are peelably separable as a unit from the release layer applied to the first region of the base panel.

16. The label structure of claim 15 wherein the adhesive on the base panel is pre-applied.

17. The label structure of claim 1 wherein the adhesive on the first panel is pre-applied and the adhesive on the laminating layer is pre-applied.

* * * * *